United States Patent [19]
Johnson et al.

[11] Patent Number: 5,974,721
[45] Date of Patent: Nov. 2, 1999

[54] HIGH-INTENSITY LIGHT-EMITTING DIODE FISHING FLOAT

[76] Inventors: Randy D. Johnson, 160 W. 3365 S., Salt Lake City, Utah 84115; John F. Johnson, 453 E. 835 N., Orem, Utah 84097

[21] Appl. No.: 09/017,192

[22] Filed: Feb. 2, 1998

Related U.S. Application Data

[63] Continuation-in-part of application No. 08/685,117, Jul. 22, 1996, abandoned.

[51] Int. Cl.⁶ .................................................. A01K 75/02
[52] U.S. Cl. .......................................... 43/17.6; 43/17.5
[58] Field of Search ................................... 43/17.5, 17.6, 43/17

[56] References Cited

U.S. PATENT DOCUMENTS

| | | | |
|---|---|---|---|
| 3,693,278 | 9/1972 | Mahone, Jr. | 43/17 |
| 4,461,114 | 7/1984 | Riead | 43/17.5 |
| 4,486,969 | 12/1984 | Swenson | 43/17 |
| 4,748,761 | 6/1988 | Machovina | 43/17 |
| 4,827,655 | 5/1989 | Reed | 43/17.5 |
| 4,884,355 | 12/1989 | Neihoff et al. | 43/17 |
| 4,896,969 | 1/1990 | Swenson | 43/17 |
| 4,916,846 | 4/1990 | Pehm | 43/17.5 |
| 5,036,615 | 8/1991 | Lu | 43/17.5 |
| 5,052,145 | 10/1991 | Wang | 43/17.5 |
| 5,119,578 | 6/1992 | Johnson | 43/17 |
| 5,157,857 | 10/1992 | Livingston | 43/17.6 |
| 5,199,205 | 4/1993 | Klammer | 43/17 |
| 5,351,431 | 10/1994 | Ryu | 43/17 |
| 5,351,432 | 10/1994 | Tse | 43/17.5 |
| 5,615,512 | 4/1997 | Wang | 43/17.5 |
| 5,675,927 | 10/1997 | Kloos | 43/17.5 |
| 5,758,449 | 6/1998 | Munsterman et al. | 43/17 |

FOREIGN PATENT DOCUMENTS

| | | | |
|---|---|---|---|
| 2464645 | 4/1981 | France | 43/17.5 |
| 174462 | 10/1965 | U.S.S.R. | 43/17.5 |
| 1115693 | 9/1984 | U.S.S.R. | 43/17.5 |
| 1127557 | 12/1984 | U.S.S.R. | 43/17.5 |
| 439732 | 12/1935 | United Kingdom | 43/17.5 |
| 446600 | 5/1936 | United Kingdom | 43/17.5 |

OTHER PUBLICATIONS

Micro Electronics Corp., High Intensity Led's.
Contec Medical, High Intensity Light Sources.
Tech Imaging Services, Inc., High Intensity Light.
Home Harvest Garden Supply, High Intensity Light Gardening.
Sensors for Medicine and Science, Inc., High Intensity Light Sources.
TLRAG Series, High Bright Dual Color Led Lamps, Sep. 1997.
"Radio Shack 1998 Catalog", pp. 194 and 196, LED's with holders (21) p. 196, 1998.

*Primary Examiner*—Michael J. Carone
*Assistant Examiner*—Fredrick T. French, III
*Attorney, Agent, or Firm*—Delbert R. Phillips

[57] ABSTRACT

An improved lighted fishing float is illustrated using a two colored high intensity light source which may be composed of either one duo colored high intensity light emitting diode or two separate colored high intensity light emitting diodes. The entire upper section of the casing is illuminated making it easier to be seen from greater distances than any other lighted fishing float on the market. The color of the light switches in response to a fish contacting a hook attached to the fishing float. The upper portion of the casing may have a magnifying lens to intensify the light beam.

15 Claims, 6 Drawing Sheets

HIGH-INTENSITY LIGHT-EMITTING DIODE FISHING FLOAT

RELATED APPLICATIONS

This application is a CONTINUATION IN PART of co-pending application Ser. No. 08/685,117 filed Jul. 22, 1996, now abandoned.

BACKGROUND OF THE INVENTION

1. Field of Invention

The present invention pertains to a lighted fishing float. The lights in the float change colors when a fish comes in contact with the lure or bait and alerting the fisherman.

2. Description of Prior Art

The lights utilized in conventional lighted floats are typically small and dim. They are difficult to see, do not clearly indicate the difference between a fish nibbling and a fish hooked, and quickly disappear from sight under water. This severely limits the kind and amount of information relayed to the fisherman.

U.S. Pat. No. 5,052,145 to Wang illustrates an illuminated fishing float with a mechanism for intensifying the light source when a fish that is attached to the float. This patent does not disclose or suggest that the light emitting source can be of two different colors one of which is switched on when a fish bites. It also uses a magnetic ball switch to apply more current to the light source when the position of the float is changed.

U.S. Pat. No. 5,199,205 to Klammer is drawn to an illuminated float with a single light source mounted within the guide. The guide moves when a fish strikes a hook which is attached to the guide. As the guide moves up and down in response to a fish strike different portions of the float are illuminated. These portions are composed of different colors thereby the float changes colors as a fish strikes.

U.S. Pat. No. 4,461,114 to Riead is drawn to a fishing float with a single light source of a single color. The light source is switched on when a fish strikes.

U.S. Pat. No. 4,827,655 to Reed discloses a fishing float with an LED light source. The LED light source is one color and does not respond to strikes by fish.

U.S. Pat. No. 5,119,578 to Johnson describes a float which has a light source that illuminates when the float member has slid the predetermined distance from the remote end of the fishing line, and the remote end has descended to the predetermined maximum depth. It does not signal strikes of fish. Only one color of light is emitted.

U.S. Pat. No. 4,748,761 to Machovina is drawn to a fishing float which has one color of light and the light is illuminated when a fish strikes.

U.S. Pat. No. 5,036,615 to Lu describes a fishing float with flash indicators. When a fish strikes the hook the light source in the float flashes.

None of these references describe a fishing float with multicolored light sources that change color when a fish strikes.

SUMMARY OF INVENTION

The light emitting fishing float is composed of a hollow top section and a hollow bottom section joined by a water tight fastening means. Preferably the fastening means is threading between the top section and the bottom section. The threading is positioned to line up electrical contacts in the first electrical switching means as the bottom section is threaded into the top section. The first electrical switching means is capable of illuminating the first color when the top section and the bottom section are fastened together. This action illuminates the first color. The hollow top section is formed of a light conductive material. This hollow top section may contain a transparent magnifying lens. The magnifying lens in combination with intense light creates a flashlight suitable for baiting hooks, untangling line, finding the way back to camp, and finding dropped or lost objects. The hollow top section accommodates a high intensity light source which is capable of displaying a first color and a second color. These colors can be any color that can be seen and interpreted under fishing conditions, preferably red and green. One embodiment contains a single light emitting diode having a first and second color. The colors in this single light emitting diode can be switched from one color to the other. In a second embodiment the light source is composed of two separate light emitting diodes each having a separate color.

The bottom section contains an electrical power source which is switchably connected to the light source. The second electrical switching means is capable of switching off the first color and switching on the second color in response to a fish contacting the hook(s). The hook(s) is/are directly connected to the second electrical switching means which has a spring contact activated by fish contacting the hook(s). Flickering between the two colors indicates a nibble, and a steady second color indicates a stronger bite. The spring contact means may be adjustable to adjust the pressure required to switch the colors of the light source. This pressure adjustment can compensate for lures of different weights, different sizes of fish, and for operation as a signaling device.

The outer casing of the lighted fishing float may have different shapes and sizes for example round, oval, boat-shaped, duck-shaped, etc.

The lighted fishing float may attract insects in the air as well as in the water, which in turn will attract fish, thereby increasing the probability that the bait under the float will be taken.

DETAILED DESCRIPTION OF THE INVENTION

Figure 1:
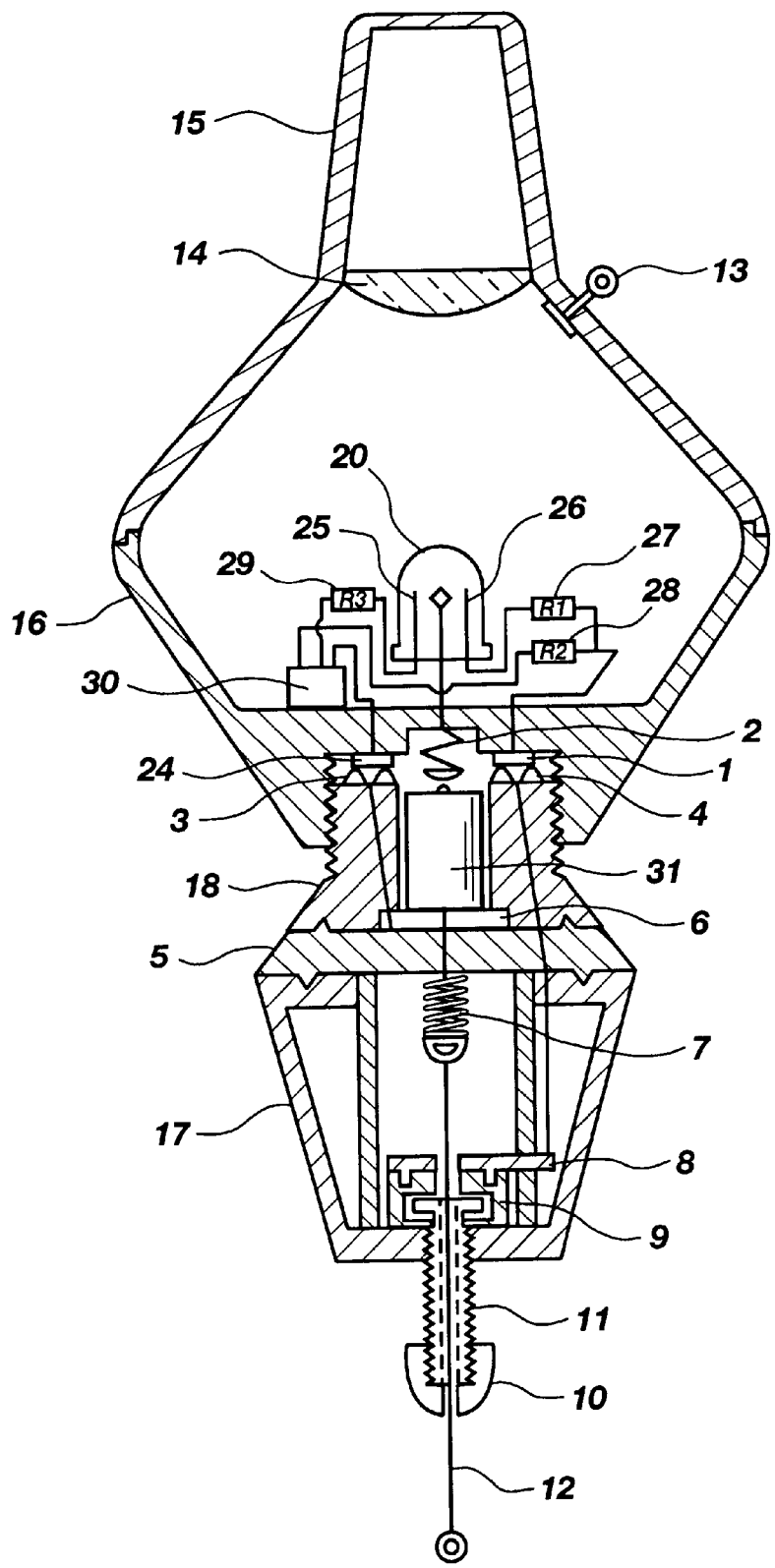
FIG. 1 depicts a broken section of the float illustrating a double color Light-Emitting Diode and other components.
Figure 2:
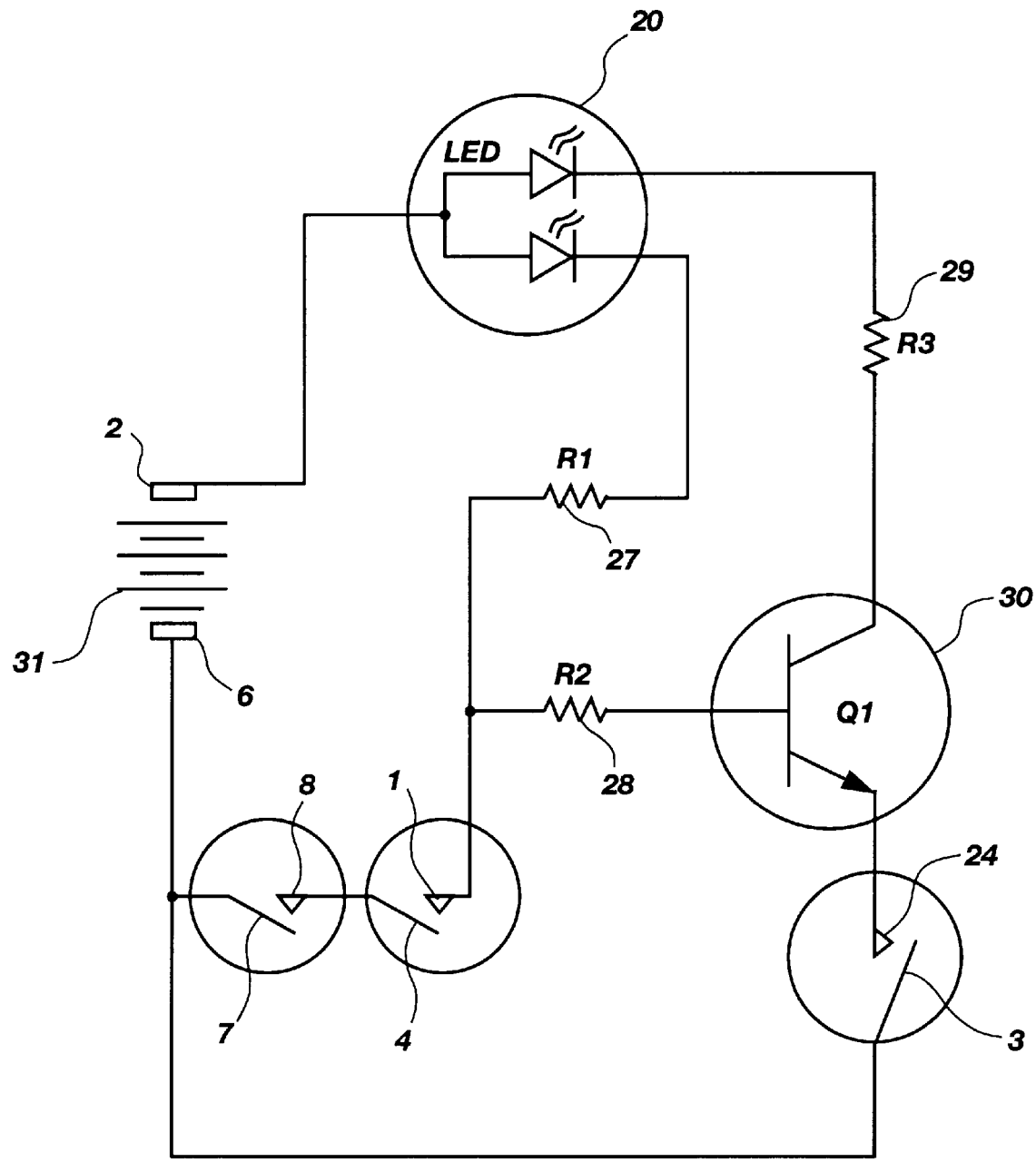
FIG. 2 is a schematic diagram illustrating the electrical circuitry of the double color Light-Emitting Diode version of the invention.

As illustrated in FIG. 1 and schematically illustrated in FIG. 2 the embodiment which utilizes the double color Light-emitting diode uses new *TRLAG Series High-bright*

Dual-color-Light-Emitting Diode Lamps which provides two different colors of light that are much brighter than the light of conventional Light-Emitting Diodes.

Figure 3:
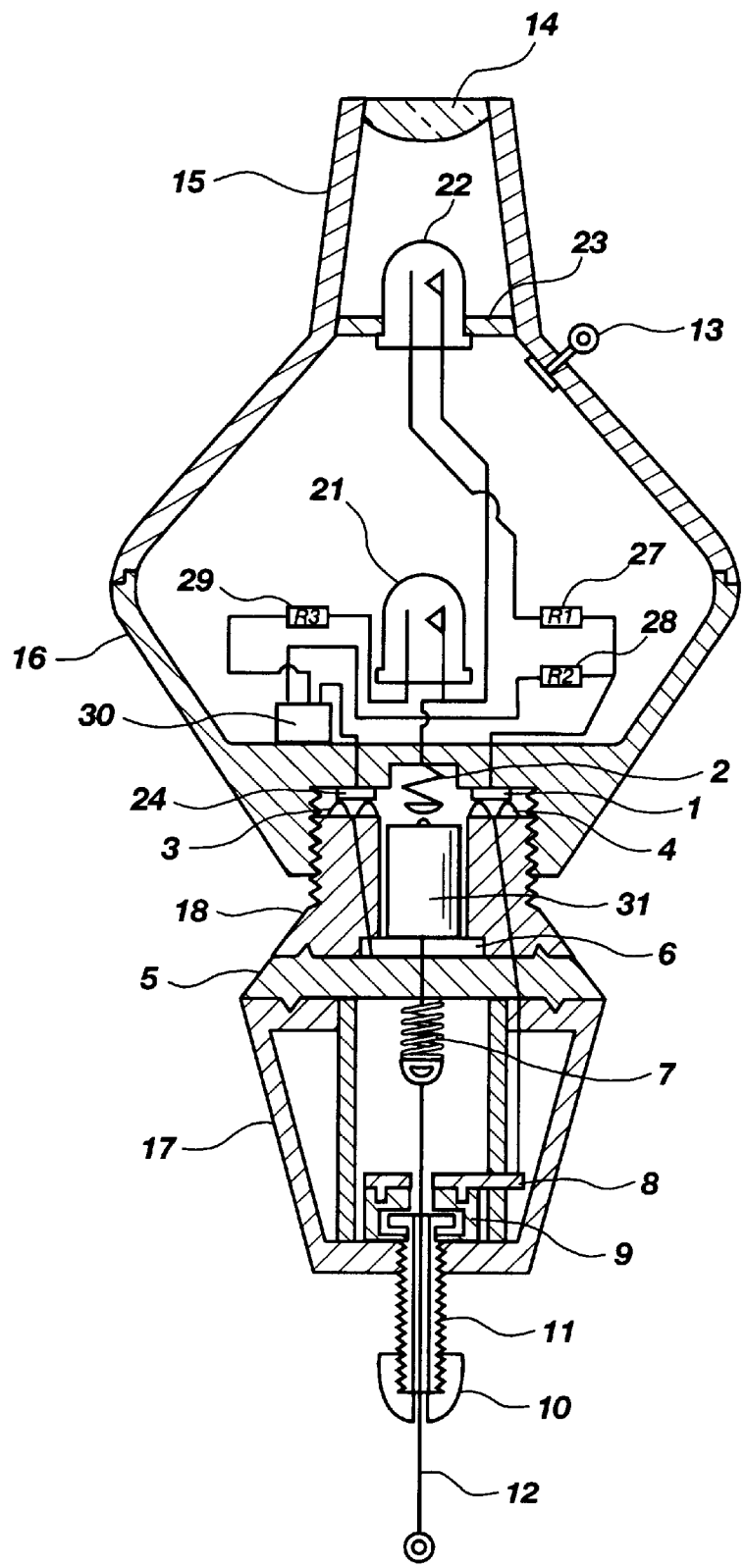
FIG. 3 shows a broken section of the float with two separate light emitting diodes of different colors and the other components.
Figure 4:
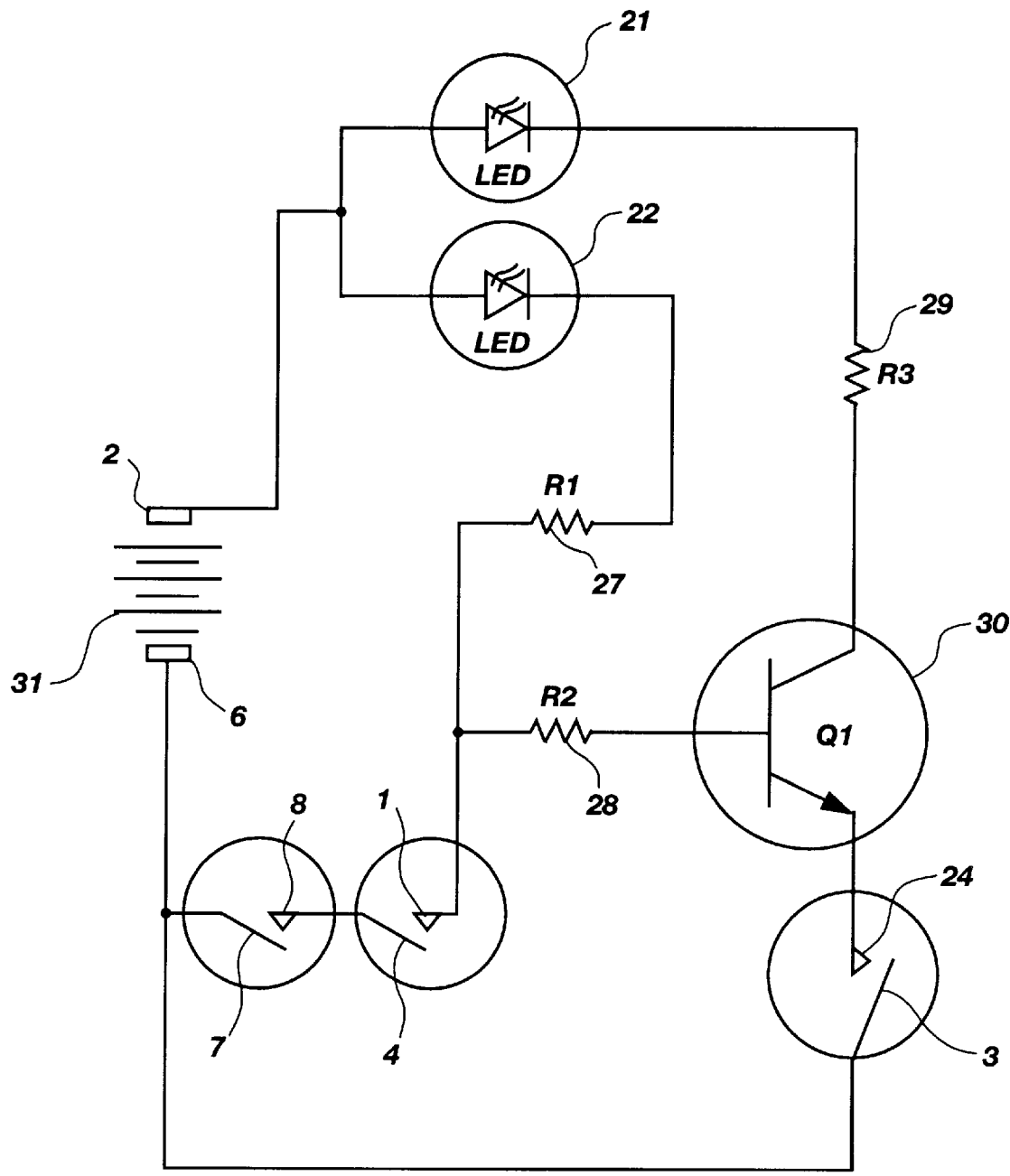
FIG. 4 is a schematic diagram illustrating the electrical circuitry of the two separate Light-Emitting Diode version of the invention.
Figure 5:
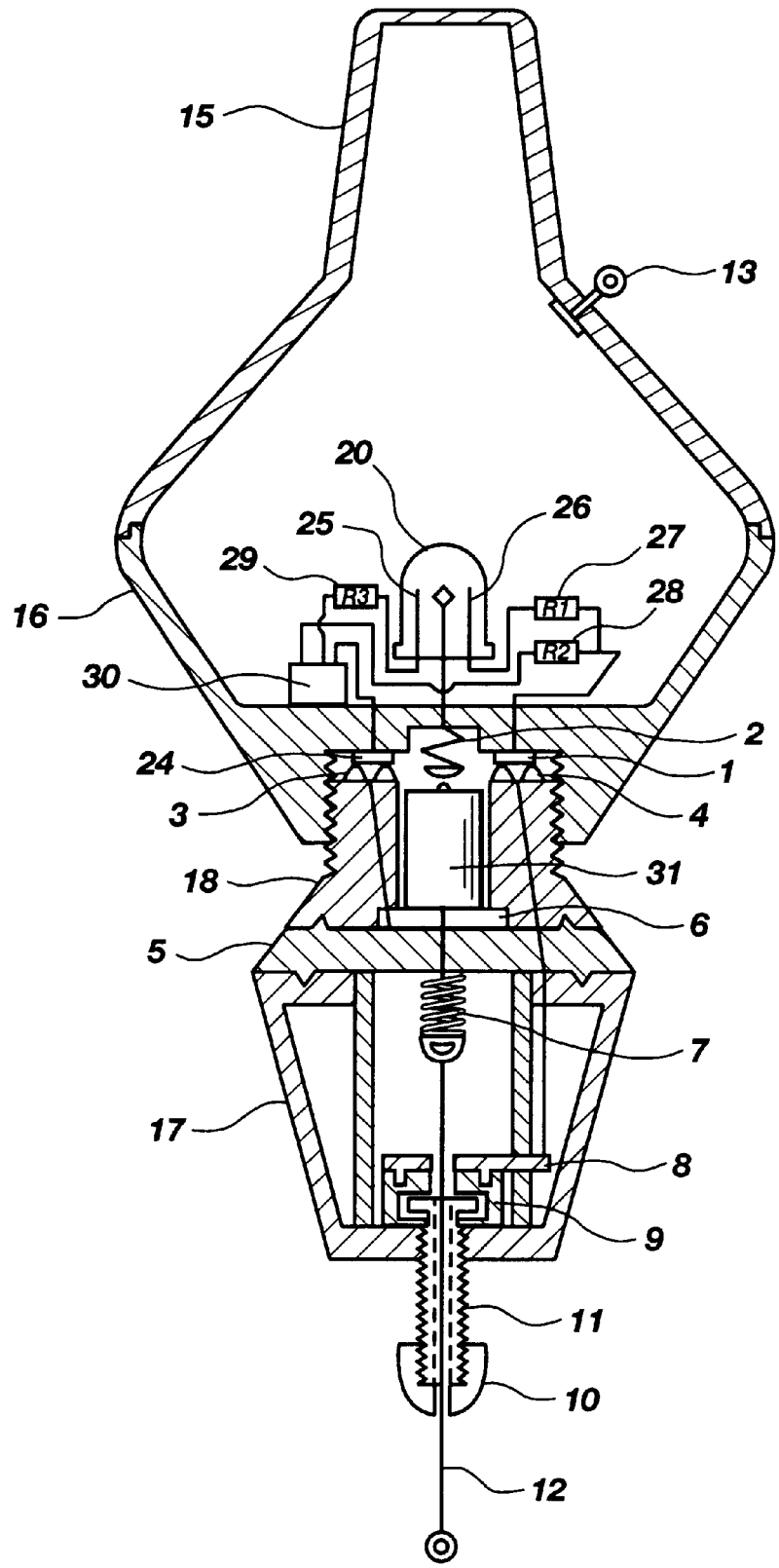
FIG. 5 illustrates a broken section of the float with a double color Light-Emitting Diode and the other components without the lens.
Figure 6:
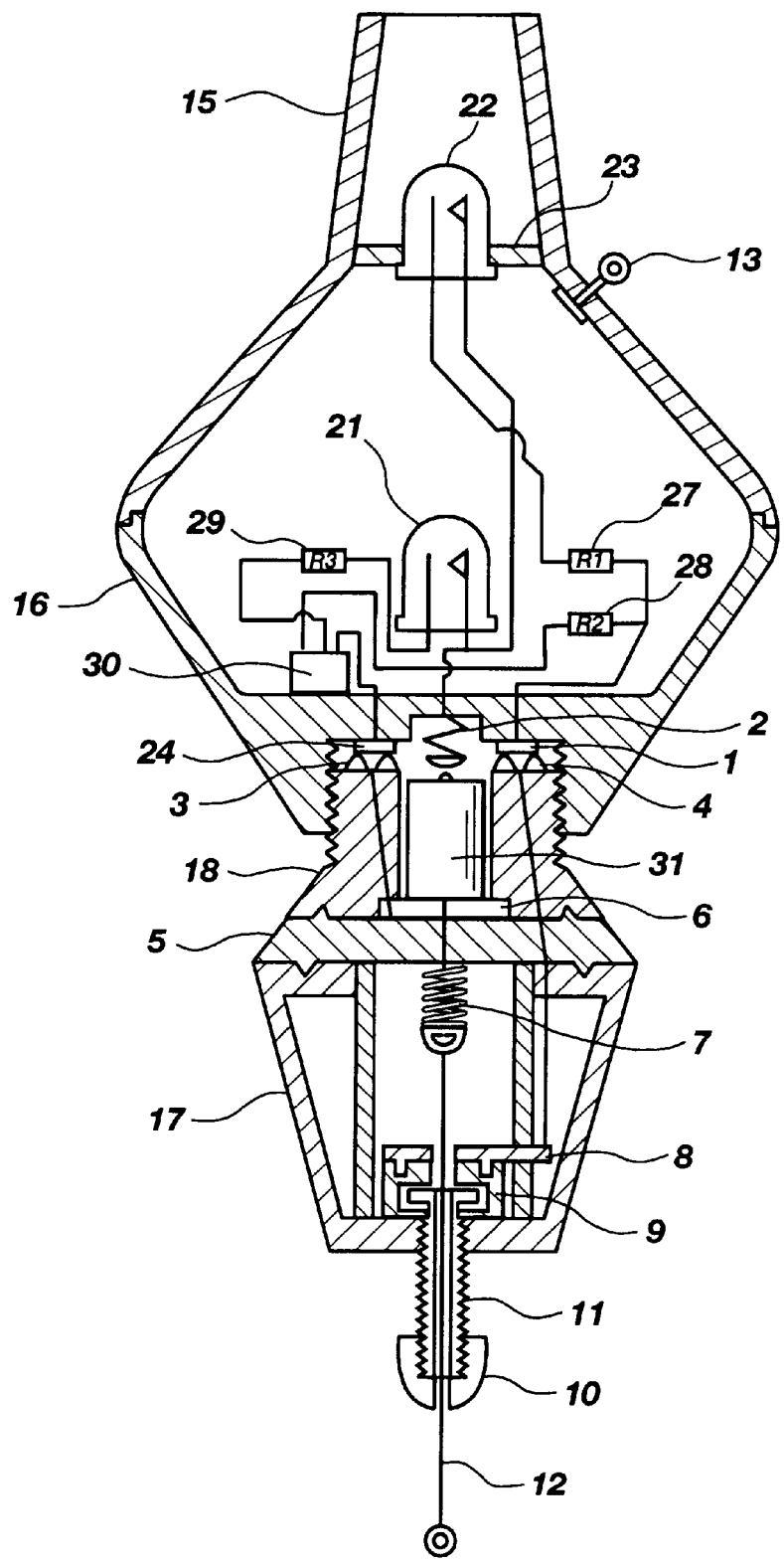
FIG. 6 shows a broken section of the float a float with two separate light emitting diodes of different colors and the other components without the lens.

Illustrated in FIG. 3 and schematically illustrated in FIG. 4 is the float using two separate light emitting diodes of two separate colors and the circuitry used to switch the colors.

The outside casing of the float is composed of five sections 15, 16, 17, 18, and 5. The top section of the outer casing is composed of 15, 16 and top eyelet 13. Top eyelet 13 provides an attachment means for the fishing line as it comes from the fishing rod. The position of lens 14 is variable depending upon whether one or two LEDs are used and this lens 14 is an integral part of the top section. See FIG. 1 and FIG. 3. The magnifying lens 14 provides a bright focused flashlight function for the float. The bottom section of the outer casing is composed of sections 18, 5 and 17. The top section is composed of light conducting material and is one integrated piece. The bottom section is one integrated piece which may be composed of any light weight material that will provide buoyance and be water resistant such as wood, plastic, or light weight non corrosive metal. The same basic casing is used for both the single light source with two color LED 20, and the double LED with the exception the LED 22 is secured by flange 23 and lens 14 is in a different position for each type of light source configuration.

The casing section 16 which is flared horizontally from the vertical axis of the float is formed into a threaded opening at the opposite end from the attachment of section 15. Section 18 is externally threaded to be accepted by the threads of the open end of section 16. Section 5 is a connecting section which supports contact 6 and provides anchoring for spring contact 7.

When the top and the bottom halves of the float are screwed together, the bottom of spring contact 2 makes contact with the positive side of battery (B-1) 31 to provide a positive voltage to the common anode of the light-emitting diode 20; contact 1 and contact 4 touch to complete a circuit that provides negative voltage to the cathode of the green side 26 of light emitting diode 20; and contact 24 and contact 3 make contact to complete a circuit that provides negative voltage through transistor (Q-1) 30 to the cathode of the red side 25 of light-emitting diode 20. The user must turn the bottom section clockwise into the top section until the red side 25 illuminates. Then the float is in operation.

The red light glows because current flows from the negative side of battery (B-1) 31 through contacts 6 and 3 and 24 to the emitter of transistor (Q-1) 30, out the collector of transistor (Q-1) 30, and through resistor (R-3) 29, which limits current flow, and through light-emitting diode 20 (red side), through spring contact 2, and back to the positive side of the battery (B-1) 31.

When the fishing line is pulled (for example, when a fish bites), downward pressure is applied via line-and-ring 12, through a longitudinally drilled hole in nut 10 and bolt 11, to spring contact 7, which makes contact with contact 8, providing a circuit for current through contacts 1 and 4, to resistor (R-1) 27. A negative potential voltage is imposed across (R-2) 28 upon the base of (Q-1) 30, which shuts off the current flow through (Q-1) 30 base-emitter junction. This turns off the red side 25 of light-emitting diode 20. Current flows through light resistor (R-1) 27, through the green side 26 of light emitting diode 20, and through spring contact 2, to the positive side of battery (B-1) 31. This turns the green side 26 light on.

This circuitry provides a steady red light during normal operation, a steady green light when a fish is pulling on the line, and alternating red and green flickering lights when the fish is nibbling.

Nut 10 and bolt 11, at the bottom of the float, are glued together. Turning nut 10 and bolt 11 clockwise drives bolt 11, cylinder 9, and contact 8 upward, toward contact 7. A portion of contact 8 protrudes through a slot in the cylinder wall to act as a guide. This allows the fisherman to adjust the length of travel required for the bottom of contact 7 to touch contact 8, and therefore also adjusts the downward pressure required of the biting fish to make the red light turn off and the green light to turn on. The shorter the distance, the less force required to make the contact.

In the double light LED configuration as illustrated in FIG. 3 and FIG. 4 the top and the bottom halves of the float are screwed together the bottom of spring contact 2 makes contact with the positive side of battery (B-1) 31 to provide a positive voltage to the anodes of the light emitting diodes 21 and 22; contact 1 and contact 4 touch to complete a circuit that provides negative voltage to the cathode of the green light-emitting diode 22, and contact 24 and contact 3 make contact to complete a circuit that provides negative voltage through transistor (Q-1) 30 to the cathode of the red light-emitting diode 21. The user must turn the bottom section clockwise into the top section until the red light illuminates. Then the float is in operation.

The red light glows because current flows from the negative side of battery (B-1) 31 through contacts 6 and 3 and 24 to the emitter of transistor (Q-1) 30, out the collector of transistor (Q-1) 30, and through resistor (R-3) 29, which limits current flow, and through the red light-emitting diode 21, through spring contact 2, and back to the positive side of the battery (B-1) 31.

When the fishing line is pulled (for example, when a fish bites), downward pressure is applied via line-and-ring 12, through a longitudinally drilled hole in nut 10 and bolt 11, to spring contact 7, which makes contact with contact 8, providing a circuit for current through contacts 1 and 4, to resistor (R-1) 27. A negative potential voltage is imposed across resistor ( R-2) 28 upon the base of (Q-1) 30, which shuts off the current flow through (Q-1) 30 base-emitter junction. This turns off the red light-emitting diode 21. Current flows through resistor (R-1) 27, through the green light-emitting diode 22, and through spring contact 2, to the positive side of battery (B-1) 31. This turns the green light on.

This circuitry provides a steady red light during normal operation, a steady green light when a fish is pulling on the line, and alternating red and green flickering lights when the fish is nibbling.

To turn float off: Turn bottom section of float counter-clockwise until light goes out.

To replace batteries unscrew bottom section of the float from the top section. Tip bottom section over, batteries will fall out. Turn bottom section right side up and insert new batteries, positive side of batteries must be up. Last, screw bottom and top sections of float together.

Although the present invention has been described in connection with two preferred embodiments thereof, many other variations and modifications will now become apparent to those skilled in the art without departing from the scope of the invention. It is preferred, therefore, that the present invention not be limited by the specific disclosure herein, but only by the appended claims.

The following is claimed:

1. A light emitting fishing float comprising;
   a hollow top section and a hollow bottom section;

said hollow top section and said hollow bottom section being joinable by a water tight fastening means;

said hollow top section being formed of a material which conducts light;

said hollow top section having an eyelet attached to the exterior surface;

said eyelet providing an attachment for the fishing line to the fishing pole;

said top section having no other openings capable of accepting said fishing line;

said hollow top section accommodating a high intensity light source;

said light source being capable of displaying a first color and a second color;

said bottom section containing an electrical power source;

said electrical power source being switchably connected to said light source;

a first electrical switching means being capable of illuminating said first color when said top section and said bottom section are fastened together;

a second electrical switching means being capable of switching off said first color and switching on said second color in response to a fish contacting a hook(s);

said hook(s) being directly connected through a second fishing line and a ring to said second electrical switching means;

and said second electrical switching means having a spring contact which is activated by fish contacting said hook(s).

2. A light emitting fishing float of claim 1 wherein said fastening means comprises threading between said top section and said bottom section.

3. A light emitting fishing float of claim 2 wherein said threading is positioned to line up electrical contacts in said first electrical switching means as said bottom section is threaded into said top section to illuminate said first color.

4. A light emitting fishing float of claim 1 wherein said light source is a single light emitting diode which can emit said first color and said second color.

5. A light emitting fishing float of claim 4 wherein said first color is red and said second color is green.

6. A light emitting fishing float as defined in claim 4 wherein said first color is red.

7. A light emitting fishing float as defined in claim 1 wherein said spring contact is adjustable to adjust the pressure required to switch said colors of said light source.

8. A light emitting fishing float as defined in claim 1 wherein said light source is composed of two separate light emitting diodes.

9. A light emitting fishing float of claim 8 wherein said first color is red and said second color is green.

10. A light emitting fishing float of claim 1 wherein said top section contains a transparent magnifying lens.

11. A light emitting fishing float capable of displaying two separate colors, one at a time comprising;

a hollow top section and a hollow bottom section;

said hollow top section having an eyelet attached to the exterior surface;

said eyelet providing an attachment for the fishing line to the fishing pole;

said top section having no other openings capable of accepting said fishing line;

said hollow top section and said hollow bottom section being joined by a water tight threading between said top and said bottom sections positioned to line up electrical contacts in a first electrical switching means as said bottom section is threaded into said top section to illuminate a first color;

said hollow top section being formed of a material which conducts light;

said hollow top section accommodating a high intensity light source;

said light source being capable of displaying said first color and a second color;

said bottom section containing an electrical power source;

said electrical power source being switchably connected to said light source;

a second electrical switching means being capable of switching off said first color and switching on said second color in response to a fish contacting a hook(s);

said hook(s) being connected through a second fishing line and a ring a connecting means to said second electrical switching means;

and said second electrical switching means having a spring contact which is activated by fish contacting said hook(s);

and said second electrical switching means being adjustable to respond to various pressures on said hook(s).

12. A light emitting fishing float of claim 11 wherein said high intensity light source is a single light emitting diode capable of emitting said first and said second color.

13. A light emitting fishing float of claim 11 wherein said first color is red and said second color is green.

14. A light emitting fishing float of claim 11 wherein said high intensity light source is two separate light emitting diodes having said first and said second colors.

15. A light emitting fishing float of claim 14 wherein said first color is red and said second color is green.

* * * * *